United States Patent [19]

Gourley

[11] Patent Number: 4,554,348
[45] Date of Patent: Nov. 19, 1985

[54] 2-AMINO-CINNAMOYLTHIOPHENE ACID AZO DYE COMPOUNDS HAVING AN ANILINE, TETRAHYDROQUINOLINE, OR BENZOMORPHOLINE COUPLER

[75] Inventor: Robert N. Gourley, Formby, England

[73] Assignee: Eastman Kodak Company, Rochester, N.Y.

[21] Appl. No.: 573,237

[22] Filed: Jan. 23, 1984

[30] Foreign Application Priority Data

Oct. 7, 1983 [GB] United Kingdom ............... 8326870

[51] Int. Cl.⁴ .................. C09B 29/033; C09B 29/09; C09B 29/36; C09B 29/44
[52] U.S. Cl. .................................. 534/768; 534/588; 534/591; 534/593; 534/728; 534/781; 534/783; 534/784; 534/794
[58] Field of Search ............... 260/152, 155; 534/768, 534/781, 783, 784, 794, 728

[56] References Cited

U.S. PATENT DOCUMENTS

| 2,805,218 | 9/1957 | Towne et al. | 260/152 |
|---|---|---|---|
| 2,827,450 | 3/1958 | Towne et al. | 260/152 |
| 3,329,669 | 7/1967 | Sartori | 260/158 |
| 3,441,554 | 4/1969 | Hahn et al. | 260/158 |
| 4,101,543 | 7/1978 | Stiot et al. | 260/152 |
| 4,255,326 | 3/1981 | Giles et al. | 260/152 |
| 4,282,144 | 8/1981 | Weaver et al. | 260/152 |
| 4,400,318 | 8/1983 | Weaver et al. | 260/152 |
| 4,459,229 | 7/1984 | Weaver et al. | 260/152 |

FOREIGN PATENT DOCUMENTS

| 560335 | 7/1958 | Canada | 260/152 |
|---|---|---|---|
| 1351381 | 4/1974 | United Kingdom | 260/152 |
| 1351382 | 4/1974 | United Kingdom | 260/152 |
| 2041961 | 9/1980 | United Kingdom | 260/152 |

Primary Examiner—Floyd D. Higel
Attorney, Agent, or Firm—Donald W. Spurrell; Daniel B. Reece, III

[57] ABSTRACT

Disclosed are new acid azo dyes prepared from 2-amino-cinnamoylthiophene compounds. These dyes give bright red to blue shades, for example, on polyester, cellulose acetate, wool and particularly polyamide fibers and exhibit improvements in one or more of such properties as bathochromic shift, fastness to light, sublimation, chlorine, heat, ozone, gas, perspiration, crock, and wash, build, pH stability, bloom resistance, depth of shade, leveling, strike rate, migration, and the like. The dyes have the general formula

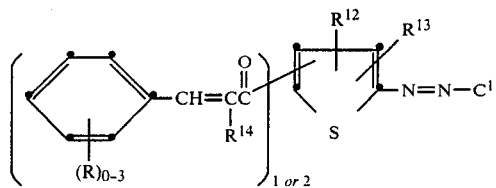

wherein $R^{14}$ is H or alkyl; R is a substituent selected, for example, from alkyl, substituted alkyl, hydroxy, alkoxy, halogen, nitro, alkoxycarbonyl, alkanoyloxy, alkanoyl, cyano, alkylamino, and dialkylamino; $C^1$ represents an aniline, tetrahydroquinoline or benzomorpholine coupling component which may be extensively substituted; each of $R^{12}$ and $R^{13}$ is selected from H, alkyl, alkoxy, acyl, halogen, and the like; and at least one of the water solubilizing groups, $—SO_3M$ or $—O-SO_3M$ is present in the dye molecule.

14 Claims, No Drawings

2-AMINO-CINNAMOYLTHIOPHENE ACID AZO DYE COMPOUNDS HAVING AN ANILINE, TETRAHYDROQUINOLINE, OR BENZOMORPHOLINE COUPLER

This invention relates to new acid azo dyes prepared from 2-amino cinnamoylthiophene compounds. These dyes give bright red to blue shades, for example, on polyester, cellulose acetate, wool, and particularly polyamide fibers and exhibit improvements in one or more of such properties as bathochromic shift, fastness to light, sublimation, chlorine, heat, ozone, gas, perspiration, crock, and wash, build, pH stability, bloom resistance, depth of shade, leveling, strike rate, migration, and the like.

The new dyes have the formula

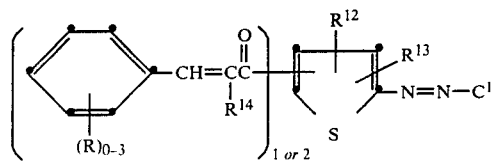 (I)

wherein each $R^{14}$ is H or alkyl; each R is a substituent selected from alkyl, hydroxy, alkoxy, carboxy, halogen, nitro, alkoxycarbonyl, alkanoyloxy, alkanoyl, cyano, alkylamino, dialkylamino, and alkyl substituted with 1–3 of halogen, alkoxy, alkanoyl, alkanoyloxy, alkoxycarbonyl, alkanoylamino, cyano, nitro, carbamoyl, alkylcarbamoyl, sulfamoyl, alkylsulfamoyl, and the like; $C^1$ represents an aniline, tetrahydroquinoline or benzomorpholine coupling component which may be extensively substituted; $R^{12}$ and $R^{13}$ are each selected from H, alkyl, alkoxy, acyl, halogen, alkylsulfonyl, alkanoyloxy, $SO_2NH_2$, $SO_2NHalkyl$, $SO_2N(alkyl)_2$, $CONH_2$, $CONHalkyl$, —COOH, $CON(alkyl)_2$, arylsulfonyl, alkanoyl, acylamido, aroyl, aryl, alkylthio, arylthio, alkenylthio, alkoxycarbonyl, hydroxyalkylcarbamoyl, cyclohexylthio, $SO_3C_6H_5$, cyano, thiocyano, cyclohexylsulfonyl, cyclohexyl, and preferably alkanoyl, aroyl, alkoxycarbonyl, $CONH_2$, $CONHalkyl$, hydroxyalkylcarbamoyl, and alkyl substituted with 1–3 of alkoxy, cyano, halogen, $SO_2alkyl$, $CONHalkyl$, alkanoyloxy, or $SO_2NHalkyl$; wherein at least one of —$SO_3M$ or —$OSO_3M$ water solubilizing groups is present in the dye molecule, where M is selected from $H^+$, $NH_4^+$, $Na^+$, $K^+$, and the colorless cations of salts of primary, secondary, and tertiary aliphatic and arylamines, such as triethylamine and the like;

Preferred dyes of the invention are those containing one cinnamoyl group, $R^{14}$ in that group being hydrogen and any R present being hydrogen, halogen, alkyl, alkoxycarbonyl, hydroxy, nitro, alkoxy, carboxy, alkanoyl, cyano, alkylamino, dialkylamino, —$SO_3M$ or —$OSO_3M$.

The coupler $C^1$ is preferably selected from

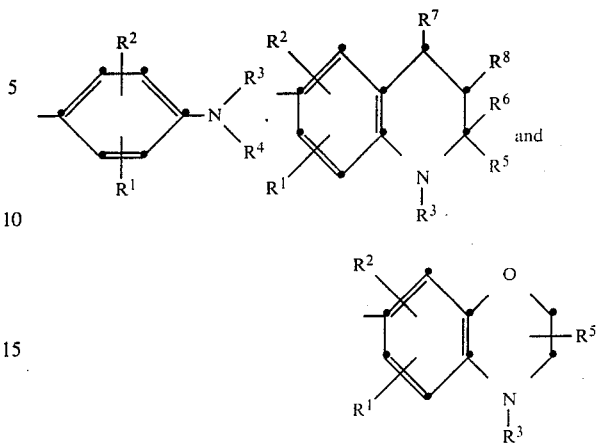

wherein $R^1$ and $R^2$ are each selected from hydrogen, fluorine, chlorine, bromine, alkyl, aryl, cycloalkyl, —COOH, alkoxy, phenoxy, alkylthio, arylthio, and radicals having the formula —NH—X—$R^9$ in which X is —CO—, —COO—, or —$SO_2$— and $R^9$ is selected from alkyl and alkyl substituted with halogen, hydroxy, phenoxy, aryl, cyano, cycloalkyl, alkylsulfonyl, alkylthio, alkanoyloxy, and alkoxy, and when X is —CO— in the formula —NH—X—$R^9$, $R^9$ also can be hydrogen, amino, alkenyl, alkylamino, dialkylamino, arylamino, aryl, or furyl;

$R^3$ and $R^4$ are selected from hydrogen; cycloalkyl; cycloalkyl substituted with one or two groups selected from alkyl, —OH, alkoxy, halogen, —COOH, and hydroxy substituted alkyl; phenyl or phenyl substituted with alkyl, —COOH, alkoxy, halogen, alkanoylamino, cyano or alkoxycarbonyl; straight or branched alkenyl; straight or branched alkyl and such alkyl substituted with 1–3 of the following:

hydroxy; —COOH; halogen; cyano; amino; alkoxy; hydroxyalkoxy; succinimido; glutarimido; phenylcarbamoyloxy; phthalimido; phthalimidino; 2-pyrrolidono; cyclohexyl; phenoxy; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

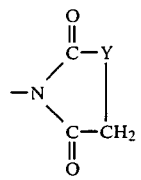

wherein Y is

—NH—, —N(alkyl)—, —O—, —S—, or —$CH_2$—O—; —S—$R^{10}$ wherein $R^{10}$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

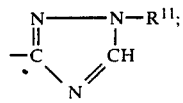

—OXR$^9$; —NH—X—R$^9$; —X—R$^9$; —CONR$^{11}$R$^{11}$; —SO$_2$NR$^{11}$R$^{11}$; wherein R$^9$ and X are as defined above and each R$^{11}$ is selected from H, alkyl, and alkyl substituted with 1-3 of halogen, hydroxy, phenoxy, alkoxy, aryl, cyano, cycloalkyl, alkylsulfonyl, alkylthio, alkanoyl, and alkanoyloxy; alkoxy substituted with hydroxy, cyano, alkanoyloxy, or alkoxy; phenoxy substituted with one or more of alkyl, alkoxy or halogen; and R$^3$ and R$^4$ combined as pentamethylene, ethyleneoxyethylene or ethylenesulfonylethylene which, with the nitrogen atom to which it is attached, forms a ring; and wherein at least one of R, R$^1$, R$^2$, R$^3$, R$^4$, R$^{12}$ and R$^{13}$ is —SO$_3$M or —OSO$_3$M, or wherein an alkyl, cycloalkyl or aryl moiety thereof is substituted with 1-3 of —SO$_3$M or —OSO$_3$M; and R$^5$, R$^6$, R$^7$ and R$^8$ are each selected from hydrogen and alkyl. All of the above alkyl, alkylene, alkenyl, and alkoxy moieties or substituents within the definitions of R through R$^{14}$ preferably contain up to six carbons.

The present couplers are prepared by procedures well known in the art as shown in the patent literature, e.g., U.S. Pat. Nos. 2,805,218; 2,827,450; and 2,839,523. The dyes of the present invention are readily prepared by reacting the acetyl group of known dyes with benzaldehyde or a substituted benzaldehyde in acetic acid with concentrated sulphuric acid as catalyst. The acetyl dye is thus converted to a cinnamoyl dye in high yield. The water-solubilizing group may be the substituent of the benzaldehyde or it may be introduced into the cinnamoyl dye at a later stage. For example, a hydroxy group in either the diazonium component or the coupling component could be reacted with sulphuric acid and then with MOH to give the —OSO$_3$M group. Alternatively a chloroalkyl group in the dye could be reacted with K$_2$SO$_3$ to give the —CH$_2$SO$_3$K group. Another method of introducing the water-solubilizing group would involve sulphonation of an aromatic ring or other reactive grouping in the dye with a sulphonating agent such as H$_2$SO$_4$ or Cl SO$_3$H. The water-solubilizing group could also be present in the coupling component prior to diazotization and coupling. The above methods of introducing the water-solubilizing group do not preclude other methods known to the art.

The invention will be further understood from the following examples which are included merely for purposes of illustration and are not intended to limit the scope of the invention.

EXAMPLE 1

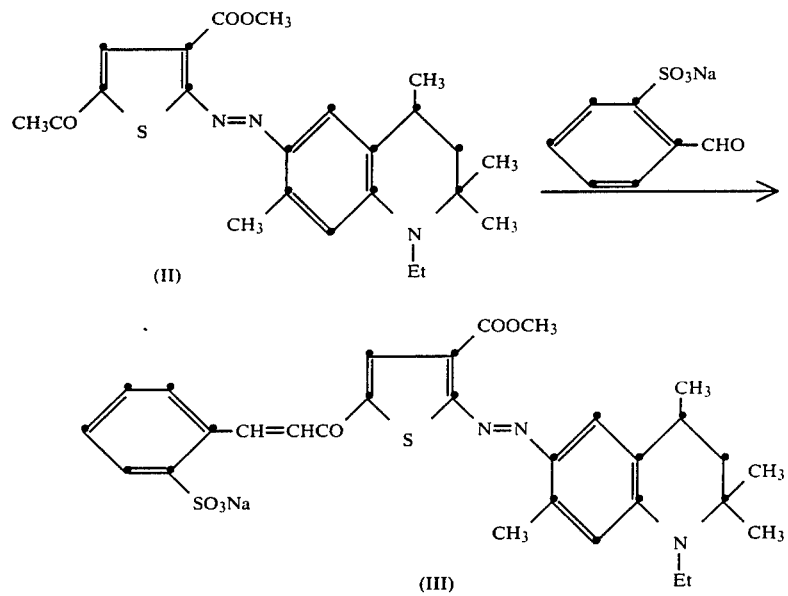

A mixture of dye (II) (2 g), benzaldehyde-2-sulphonic acid, sodium salt (2g), acetic acid (30 ml) and concentrated sulphuric acid (3 ml) was stirred at 100° C. for two hours The reaction mixture was poured into cold water and made pH 4 by adding 50% KOH solution. The dye (III) was filtered off, washed with a little cold water, and dried. The yield of dye (III) was 2.8 g.

EXAMPLE 2

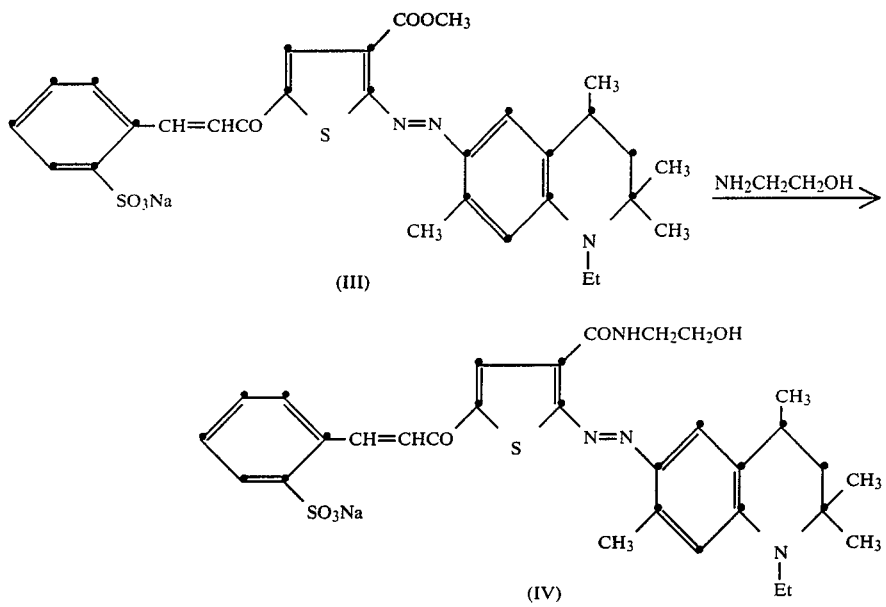

A mixture of dye (III) (1.3 g) and ethanolamine (5 ml) was stirred at 25° C. for two hours, then drowned into KCl solution and the dye (IV) filtered off. The yield of (IV) was 2.1 g.

EXAMPLE 3

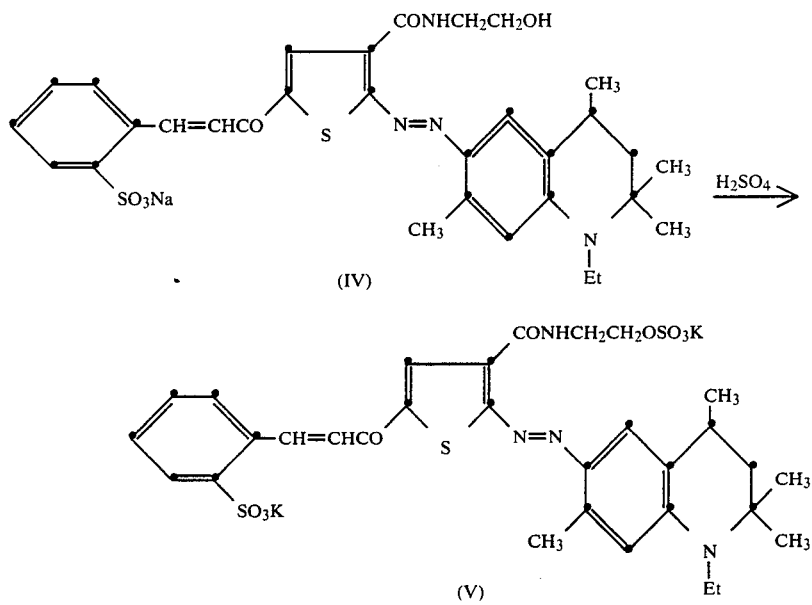

The dye (IV) (1 g) was added to stirred cooled conc. $H_2SO_4$ (5 ml) and the mixture stirred at 10° C. for 30 minutes. The solution was then added to icewater and made just basic with KOH solution at 0°–10° C., stirred for one hour and the dye filtered off. The yield of dye (V) was 1.3 g.

The dyes (III), (IV) and (V) from Examples 1, 2 and 3 were applied to nylon fibers by known techniques and gave bright blue to greenish blue shades with good dyeing and fastness properties.

By using similar methods to those described above, the following dyes are obtained.

| EX. NO. | DYE STRUCTURE | SHADE ON DYE |
|---|---|---|
| 4 | (2-Cl-C6H4)-CH=CHCO-[thiophene with COOCH3]-N=N-[2,5-dimethylphenyl with N(CH2CH(CH3)2)(CH2CH2OSO3K)] | Blue |
| 5 | (4-KO3SO-C6H4)-CH=CHCO-[thiophene with CONHCH3]-N=N-[2,5-dimethylphenyl with N(Et)(CH2C(CH3)2CH3)] | Blue |
| 6 | C6H5-CH=CHCO-[thiophene with CONHCH2CH2OSO3K]-N=N-[3-methylphenyl with N(Et)(CH2CH2SO3K)] | Reddish-blue |
| 7 | (2-OCH3, 5-SO3K-C6H3)-CH=CHCO-[thiophene with COOCH3]-N=N-[2,5-dimethylphenyl with N(Et)(CH2CH(CH3)2-O)] | Blue |
| 8 | (4-(KO3SO-CH2CH2O)-C6H4)-CH=CHCO-[thiophene with CONH2]-N=N-[3-methylphenyl with N(Et)(CH2CH2SO3K)] | Reddish-blue |
| 9 | C6H5-CH=CHCO-[thiophene with COOCH3]-N=N-[phenyl with OCH3, NHCOCH3, NHCH2CH2OSO3K] | Greenish-blue |

| EX. NO. | DYE STRUCTURE | SHADE ON DYE |
|---|---|---|
| 10 | (structure: phenyl-CH=CHCO-C(CH₃)=C(COOEt)-S- thiophene linked via N=N to a substituted aryl bearing CH₃, CH₃ groups and a N(C(CH₃)₂CH₂CH(CH₃)—) with N–CH₂CH₂OSO₃K) | Reddish-blue |

Dyeings on nylon 6,6 carpeting are carried out as follows:

A sample containing 66.70 mg of pure dye is dissolved in hot demineralized water. If the acid dye cake will not dissolve in hot water use 5 ml of 2-methoxyethanol (methyl Cellosolve) or other satisfactory solvent. Sufficient demineralized water is added to make 30:1 dyebath and added are 1% owf ammonium hydroxide, and 0.5% Versene 100 sequestering agent ethylenediaminetetraacetic acid (chelator). The pH is adjusted to 6.0 with acetic acid. A ten gram sample of nylon carpet wet out in demineralized water is entered into the dyebath which is placed in a pressure type Launder-Ometer container. The pressure container is entered into a Launder-Ometer at room temperature. The temperature is brought up to 208° F. at 5° F./minute and the dyeing is carried out at this temperature for one hour. The pressure container is removed from the Launder-Ometer and cooled. The dyed carpet is removed from the pressure container, rinsed in hot filtered water and then cold demineralized water, and dried at 250° F.

The following tables show exemplary dyes of the present invention wherein the —OCO— groups are oriented either —COO— or —OOC—.

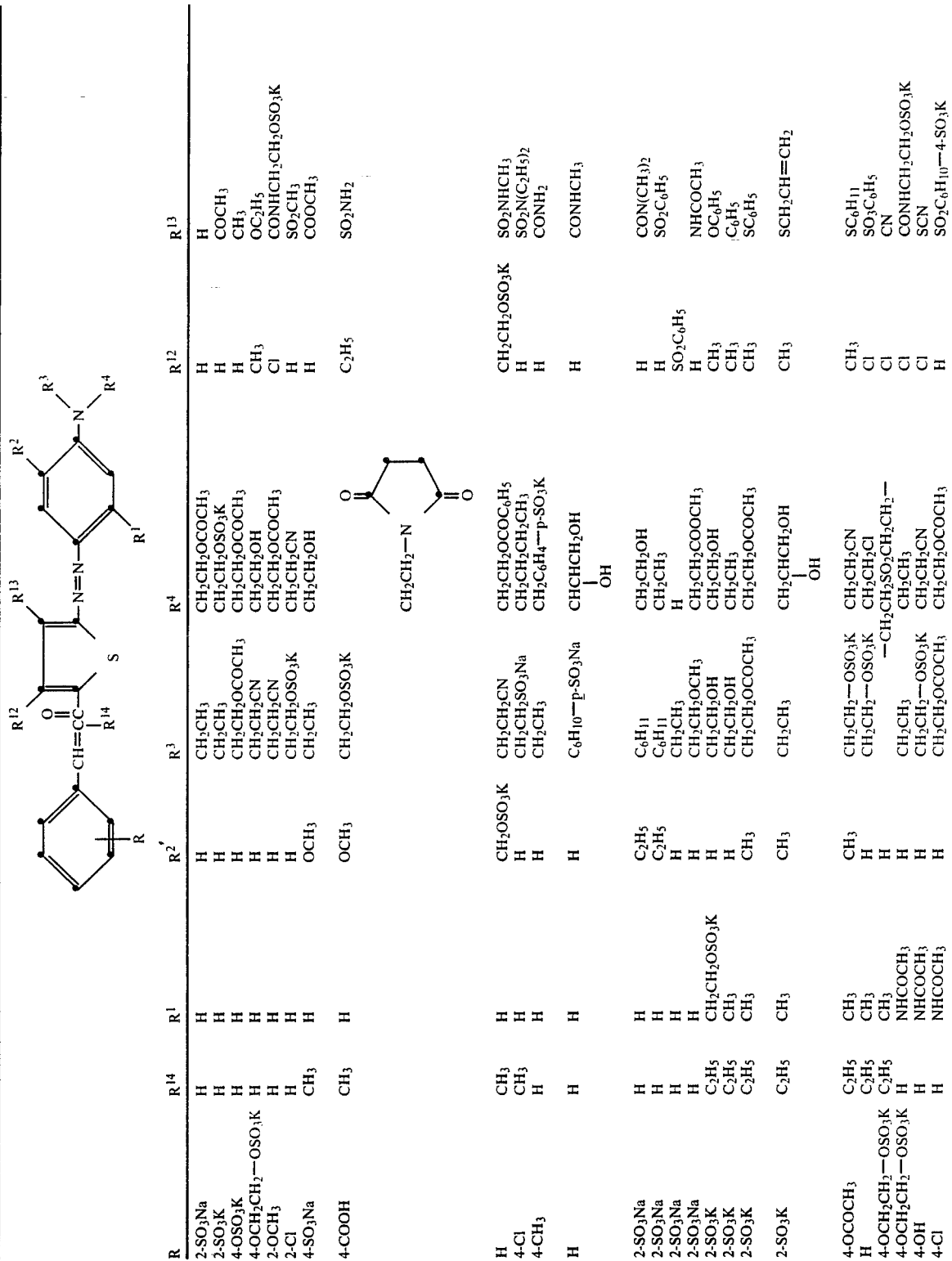
TABLE 1

TABLE 1-continued

[Structure: A compound with a phenyl ring bearing R substituent, connected via CH=C(COR14)-S-C(CH3)=C(R13)-N=N- to a phenyl ring bearing R2, R1, and NR3R4 groups, with R12 on the azo-linked ring.]

| R | R¹ | R² | R³ | R⁴ | R¹² | R¹³ | R¹⁴ |
|---|---|---|---|---|---|---|---|
| 2-Cl | NHCOCH₃ | CH₃ | H | CH₂CH₂CN | H | SC₂H₄—OSO₃K | H |
| 4-NO₂ | NHCOCH₃ | CH₃ | H | CH(CH₃)CH₂CH₃ | H | COC₆H₄—p-SO₃Na | H |
| 4-SO₃Na | H | OCH₃ | H | C₆H₁₁ | H | COOCH₃ | H |
| 2-CH₃ | CH₃ | H | CH₂CH₂—OSO₃K | CH₂CH₂SO₂NH₂ | H | OOCCH₃ | H |
| 4-NO₂ | NHCOCH₃ | H | H | CH₂C₆H₁₀—4-SO₃K | H | CONHCH₂CH₂OH | H |
| 2-Cl | NHCOCH₃ | H | H | CH₂CH₂OCH₂CH₂—OSO₃K | H | CONHCH₂CH₂—OSO₃K | H |
| 2-OCH₃ | NHCOCH₃ | H | H | CHCH₃<br>CH₂CO₂CH₂CH₃ | H | CONHCH₂CH₂—OSO₃K | C₃H₇—n |
| 4-OCH₃ | NHCOCH₃ | H | H | CH—CH₂CH(CH₃)₂<br>CH₂CH(CH₃)₂ | H | CONHCH₂CH₂—OSO₃K | C₃H₇—n |
| 3-NO₂ | NHCOCH₃ | H | CH₂CH₂—OSO₃K | CH₂CH(CH₂)₄CH₂OH<br>OH | H | | C₃H₇—n |
| 2-OH | NHCOCH₃ | CH₃ | H | CH(CH₃)CH₂CH₃ | H | CH₂OSO₃Na | C₃H₇—n |
| 4-SO₃K | H | CH₃ | H | C₆H₁₁ | H | CH₃ | C₃H₇—n |
| 4-CH₂CH₂OSO₃K | H | H | CH₃ | H | COOC₂H₅ | COOC₂H₅ | H |
| 2-CH₃ | NHCOCH₂—OSO₃K | H | CH₃ | CH₃ | H | H | H |
| 4-COOCH₃ | NHCOCH₂—OSO₃K | H | CH₂CH₃ | CH₂CH₃ | H | CH₂CH₂CH₂—OSO₃K | H |
| 4-CH₃ | H | H | CH₂CH₃ | C₆H₅ | H | CH₂CH₂CN | H |
| 2-OCH₃ | H | H | CH₂CH₃ | C₆H₁₀—4-SO₃K | H | CH₂SO₂CH₃ | H |
| 3-OCH₃ | H | H | CH₂CH₂OSO₃K | CH₂CH₂OH | H | CH₂COOCH₃ | H |
| 4-OCH₃ | H | H | CH₂CH₂OSO₃K | CH₂CH₂OCOCH₃ | H | CH₂OOCH₃ | H |
| 4-COOCH₃ | H | H | CH₂CH₂OSO₃K | CH₂CH(OD)CH₂OH | H | CH₂CONHCH₃ | H |
| 2-Cl | H | H | CH₂CH₂CN | CH₂CH₂CN | H | CH₂SO₂NHCH₂CH₂—SO₃Na | H |
| 4-Cl | H | H | CH₂CH₂CN | CH₂CH₂CN | H | H | H |
| 4-N(CH₃)₂ | H | H | CH₂CH₂OSO₃K | CH₂CH₂OCOC₆H₅ | H | H | H |
| 2-OH | H | H | CH₂CH₂CN | CH₂CH₂OCOCH₂—OSO₃K | H | COCH₂CH₂—SO₃Na | H |
| 3-CN | H | H | CH₂CH₂OH | CH₂CH₂OCOCH₃ | H | CH₃ | H |
| 4-OSO₃K | H | H | CH₂CH₂OCOCH₃ | CH₂CH₂OCOCH₃ | H | OC₂H₅ | H |
| 2-SO₃K | Cl | Cl | CH₂CH₂OCOCH₃ | —CH₂CH₂SO₂CH₂CH₂— | Cl | Cl | H |
| 2-SO₃K | Cl | H | H | CH₂CH₂CN | H | SO₂CH₃ | H |

TABLE 1-continued

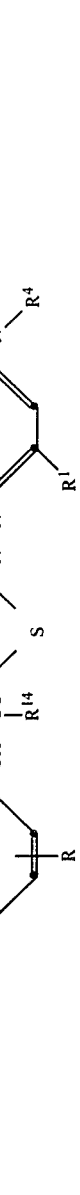

| R | R¹⁴ | R¹ | R² | R³ | R⁴ | R¹² | R¹³ |
|---|---|---|---|---|---|---|---|
| 2-SO₃K | H | CH₃ | H | CH₂CH₃ | CH₂CH—CH₂OCCH₃<br>      \|           \|\|<br>      O—CCH₃<br>         \|\|<br>         O | H | COOCH₃ |
| 4-COOCH₃ | H | CH₃ | H | CH₂CH₃ | CH₂CH₃ | H | SO₂NH₂ |
| H | H | CH₃ | H | CH₂CH₃ | CH₂CH₂OH | H | SO₂NHCH₂CH₂—OSO₃K |
| 3-OCH₃ | H | CH₃ | H | CH₂CH₃ | CH₂CH₂—SO₃NH(CH₃)₃ | H | SO₂N(C₂H₅)₂ |
| 3-NO₂ | H | CH₃ | H | CH₂CH₂CN | CH₂CH₂—SO₄NH(CH₃)₂Ph | H | CONH₂ |
| 2-SO₃K | H | NHCOCH₃ | H | CH₂CH₃ | CH₂CH₃ | H | CONHCHCH₂—SO₃NH(CH₃)₃ |
| 2-SO₃K | H | NHCOCH₃ | H | CH₂CH₃ | CH₂CH₂OCOCH₃ | H | CON(CH₃)₂ |
| 2-SO₃K | H | NHCOC₆H₅ | H | CH₂CH₃ | (CH₂CH₂O)₂CH₂CH₃ | H | SO₂C₆H₅ |
| 4-N(C₂H₅)₂ | H | NHCOCH₃ | CH₃ | CH₂CH₂CONH₂ | CH₂CH₂—OSO₃NH(CH₃)₃ | CH₃ | SO₂C₆H₅ |
| 4-SO₃K | H | NHCOCH₃ | H | H | CH₂CH₂—OSONH(CH₃)₃ | CH₃ | NHCOCH₃ |
| 4-SO₃K | H | NHCOCH₃ | OCH₃ | CH₂CH₃ | CH₂CH₂OCOCH₃ | CH₃ | OC₆H₅ |
| 2-CH₃ | H | NHCOCH₃ | OCH₃ | CH₂CH₂—OSO₃K | CH₂CH(OH)CH₃ | CH₃ | C₆H₅ |
| 4-CH₃ | H | NHCOCH₃ | OCH₃ | CH₂CH₂—OSO₃K | CH₂CH₂OH | Cl | SC₆H₅ |
| 2-OCH₃ | H | NHCOCH₃ | OCH₃ | CH₂CH₂OH | CH₂CH₂OCOCH₃ | Cl | SCH₂CH=CH₂ |
| 2-OH | H | NHCOCH₃ | OCH₃ | CH₂CH₂OCOCH₃ | C₆H₁₁ | Cl | SC₆H₁₀—4-SO₃Na |
| 4-CO₂CH₃ | H | NHCOCH₃ | OCH₃ | CH₂CH₂—OSO₃K | C₆H₅ | Cl | SO₃C₆H₄—p-SO₃K |
|   |   |   |   |   |   |   | CN |
| 2-Cl | H | NHCOCH₃ | H | CH₂CH₂—OSO₃K | CH₂CH₂OCNH—C₆H₅<br>              \|\|<br>              O | Cl | SCN |
| 4-Cl | H | NHCOCH₃ | H | CH₂CH₂—OSO₃K | CH₃CH₂S—⟨N=⟩—S | Cl | SCN |

TABLE II

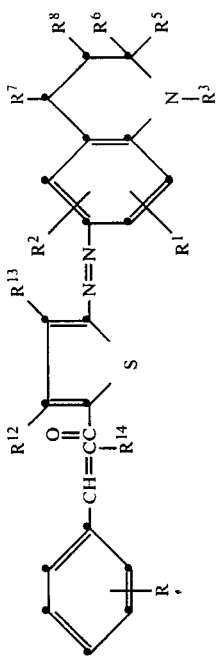

| R | $R^{14}$ | $R^1, R^2, R^5, R^6, R^7, R^8$ | $R^3$ | $R^{12}$ | $R^{13}$ |
|---|---|---|---|---|---|
| 2-SO₃Na | H | 2,7-di-CH₃ | C₂H₅ | H | H |
| 2-SO₃K | H | 2,5-di-CH₃—8-OCH₃ | CH₂CH(OH)CH₂OH | H | COCH₃ |
| 4-OSO₃K | H | 2,2,4,7-tetra-CH₃ | C₂H₄CONH₂ | H | CH₃ |
| 4-OCH₂CH₂—OSO₃K | H | 2,2,4-tri-CH₃ | C₂H₄NHCOCH₃ | H | OC₂H₅ |
| 2-Cl | H | 2-CH₃—7-NHCOCH₃ | C₂H₄CN | Cl | CH₂CH₂—OSO₃K |
| 2-CH₃ | CH₃ | 2,2,4-tri-CH₃—7-NHCOCH₃ | C₂H₄Cl | H | SO₂CH₂CH₂—OSO₃Na |
| 2-CH₃ | CH₃ | 2-CH(CH₃)₂—7-NHCOCH₃ | C₂H₄OCOCH₂—OSO₃NH(CH₃)₃ | H | COOCH₃ |
| 4-OCH₃ | CH₃ | 7-CH₃ | C₂H₄OC₂H₅ | H | SO₂NH₂ |
| 2-SO₃K | CH₃ | 7-CH₃ | C₂H₄CONHC₂H₅ | H | SO₂NHCH₃ |
| 2-SO₃K | CH₃ | 7-CH₃ | C₂H₄CONHC₂H₅ | H | SO₂N(C₂H₅)₂ |
| 2-SO₃K | H | 7-CH₃ | C₂H₄CONHCH₂C₆H₅ | H | CONH₂ |
| 2-SO₃K | H | 7-CH₃ | C₂H₄OOCOC₂H₅ | H | CONHCH₃ |
| 2-OSO₃K | H | 2,2,4-di-CH₃—5,8-di-OCH₃ | C₂H₄NHCOCH=CH₂ | H | CON(CH₃)₂ |
| 4-Cl | H | 2,2,4-tri-CH₃—8-OCH₃ | CH₂C₆H₅ | H | SO₂C₆H₄—p-OSO₃K |
| 4-CO₂C₂H₅ | H | 2-CH₃—7-NHCOCH₃ | C₂H₄CONHCH₂OH | H | SO₂C₆H₄—p-OSO₃K |
| 4-CH₃CO | H | 7-CH₃ | C₂H₄NHCONHC₂H₅ | H | NHCOCH₂CH₂—SO₃K |
| 4-Br | C₂H₅ | 2,7-di-CH₃ | CH₂CH₂—OSO₃K | CH₃ | OC₆H₅ |
| 2-CN | C₂H₅ | 2,5-di-CH₃—8-OCH₃ | C₂H₄SO₂NH₂ | CH₃ | C₆H₄—p-OSO₃K |
| 4-OCH₃ | C₂H₅ | 2,2,4,7-tetra-CH₃ | C₂H₄SO₂NHC₂H₅ | CH₃ | SC₆H₄—p-OSO₃K |
| 4-OH | C₂H₅ | 2,2,4-tri-CH₃ | C₂H₄SCH₂CH₂—SO₃Na | CH₃ | SCH₂CH=CH₂ |
| 2-OH | C₂H₅ | 2-CH₃—7-NHCOCH₃ | ![structure with CH₂CH₂S—C=N and phenyl ring] | CH | SC₆H₁₀—4-OSO₃K |
| 2-NO₂ | C₂H₅ | 2,2,4-tri-CH₃—7-NHCOCH₃ | ![structure CH₂CH₂S—C with N—NH—CH=N ring] | Cl | SO₃C₆H₄—p-SO₃Na |
| 2-SO₃K | C₂H₅ | 2,2,4-tri-CH₃—7-NHCOC₂H₅ | C₂H₅ | Cl | CN |

TABLE II-continued

![Structure with R groups R¹-R⁸, R¹², R¹³, R¹⁴ on fused ring system with N=N azo linkage]

| R | R¹⁴ | R¹, R², R⁵, R⁶, R⁷, R⁸ | R³ | R¹² | R¹³ |
|---|---|---|---|---|---|
| 2-SO$_3$K | H | 2-CH(CH$_3$)$_2$—7-NHCOCH$_3$ | —CH$_2$CH$_2$—N(COCH$_2$)(COCH$_2$) (ring) | Cl | Cl |
| 2-SO$_3$K | H | 7-CH$_3$ | C$_2$H$_4$O—C$_6$H$_4$ | Cl | SCN |
| 4-NO$_2$ | H | 7-CH$_3$ | C$_2$H$_4$—N(CO—N-CH$_3$)(CO—CH$_2$) | H | SO$_2$C$_6$H$_{10}$—4-OSO$_3$K |
| 4-SO$_3$K | H | 7-CH$_3$ | CH$_2$CHCH$_2$OH (OH) | H | SC$_2$H$_5$ |
| 4-N(CH$_3$)$_2$ | H | 7-CH$_3$ | C$_2$H$_4$—N(CO—O)(CO—CH$_2$) | H | COC$_6$H$_4$—p-OSO$_3$K |
| 4-N—(C$_2$H$_5$)$_2$ | H | 7-CH$_3$ | C$_2$H$_4$—N(CO—CH$_2$)(CO—CH$_2$) | H | COOCH$_2$CH$_2$—OSO$_3$Na |
| 4-CH$_3$CO | H | 2,2,4-di-CH$_3$—5,8-di-OCH$_3$ | C$_2$H$_4$—N(COCH$_2$CH$_2$)(COCH$_2$) | H | OOCCH$_2$CH$_2$—OSO$_3$Na |

TABLE II-continued

| R | R[14] | R[1], R[2], R[5], R[6], R[7], R[8] | R[3] | R[12] | R[13] |
|---|---|---|---|---|---|
| 2-NO$_2$ | H | 2,2,4-tri-CH$_3$—8-OCH$_3$ | ![structure: C$_2$H$_4$—N(CO)$_2$C$_6$H$_4$] | CH$_2$—OSO$_3$K | CONHCH$_2$CH$_2$OH |
| 4-Cl | H | 2-CH$_3$—7-NHCOCH$_3$ | ![structure: C$_2$H$_4$—N(CO—NH)(CO—CH$_2$)] | CH$_2$—OSO$_3$K | H |
| 4-CH$_3$ | H | 7-CH$_3$ | ![structure: C$_2$H$_4$—N(COCH$_2$—O)(COCH$_2$)] | CH$_2$—OSO$_3$K | H |
| 2-CH$_3$ | C$_3$H$_7$—n | 2,7-di-CH$_3$ | ![structure: C$_2$H$_4$—N saccharyl (C=O, SO$_2$, benzene)] | H | CONHCH$_2$CH$_2$OSO$_3$K |
| 3-CH$_3$ | C$_3$H$_7$—n | 2,5-di-CH$_3$—8-OCH$_3$ | ![structure: C$_2$H$_4$—N(CO—S)(CO—CH$_2$)] | H | CONHCH$_2$CH$_2$OSO$_3$K |
| 4-OCH$_3$ | C$_3$H$_7$—n | 2,2,4,7-tetra-CH$_3$ | ![structure: C$_2$H$_4$—S—C(=N)—N(NC$_2$H$_5$)—CH=N triazole] | H | CONHCH$_2$CH$_2$OSO$_3$K |

TABLE II-continued

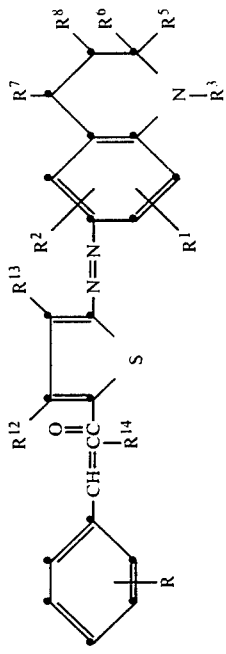

| R | $R^1, R^2, R^5, R^6, R^7, R^8$ | $R^3$ | $R^{12}$ | $R^{13}$ | $R^{14}$ |
|---|---|---|---|---|---|
| 4-CN | 2,2,4-tri-CH$_3$ | | H | CONHCH$_2$CH$_2$OSO$_3$K | C$_3$H$_7$—n |
| 4-COOH | 2-CH$_3$—7-NHCOCH$_3$ | ![](CO-CH$_2$, CH$_2$CH$_2$, C$_2$H$_4$N—) | CH$_2$CH$_2$—OSO$_3$Na | COOC$_2$H$_5$ | C$_3$H$_7$—n |
| H | 2,2,4-tri-CH$_3$—7-NHCOCH$_3$ | (C$_2$H$_4$NHC(O)-phenyl) | H | CH$_2$CH$_2$—OSO$_3$K | H |
| H | 2-CH(CH$_3$)$_2$—7-NHCOCH$_3$ | (C$_2$H$_4$NHC(O)-phenyl) | H | CH$_2$CH$_2$—OSO$_3$K | H |
| 4-SO$_3$K | 7-CH$_3$ | (CH$_2$CH$_2$S—triazole) | H | CH$_2$OC$_2$H$_5$ | H |
| 4-SO$_3$K | 7-CH$_3$ | C$_2$H$_4$OH | H | CH$_2$CH$_2$CN | H |

TABLE II-continued

| R | $R^{14}$ | $R^1, R^2, R^5, R^6, R^7, R^8$ | $R^3$ | $R^{12}$ | $R^{13}$ |
|---|---|---|---|---|---|
| 4-SO$_3$K | H | 7-CH$_3$ | CH$_2$CH$_2$—N(C(=O))(SO$_2$)-benzo | H | CH$_2$SO$_2$CH$_3$ |
| 4-SO$_3$K | H | 2,2,4,7-tetra-CH$_3$ | CH$_2$CH$_2$OCNH—phenyl (O=) | H | CH$_2$COOCH$_3$ |
| 4-SO$_3$K | H | 2,2,4,7-tetra-CH$_3$ | CH$_2$CH$_2$N(C(=O))$_2$-benzo | H | CH$_2$OOCH |

TABLE III

| R | R¹⁴ | R¹, R², R⁵ | R³ | R¹² | R¹³ |
|---|---|---|---|---|---|
| 2-SO₃Na | H | 3,6-di-CH₃ | C₂H₅ | H | H |
| 2-SO₃K | H | 3-CH₃ | CH₂CH(OH)CH₂OH | H | COCH₃ |
| 4-OSO₃K | H | 3-CH₃—6-NHCOCH₃ | C₂H₄CONH₂ | H | CH₃ |
| 4-OCH₂CH₂—OSO₃K | H | 6-NHCOCH₃ | C₂H₄NHCOCH₃ | H | OC₂H₅ |
| 4-CH₂—OSO₃NH(CH₃)₃ | H | 3,6-di-CH₃ | C₂H₄CN | Cl | Cl |
| 4-CONHCH₂CH₂OSO₃K | H | 3-CH₃ | C₂H₄Cl | H | SO₂CH₃ |
| 2-SO₃Na | CH₃ | 3-CH₃—6-NHCOCH₃ | C₂H₄OOCC₂H₅ | H | COOCH₃ |
| 2-SO₃K | CH₃ | 6-NHCOCH₃ | C₂H₄OC₂H₅ | H | SO₂NH₂ |
| 4-OSO₃K | CH₃ | 3,6-di-CH₃ | C₂H₄CONHC₂H₅ | H | SO₂NHCH₃ |
| 4-OCH₂CH₂—OSO₃K | CH₃ | 3-CH₃ | C₂H₄CONHC₂H₅ | H | SO₂N(C₂H₅)₂ |
| 4-CH₂—OSO₃NH(CH₃)₃ | H | 3-CH₃—6-NHCOCH₃ | C₂H₄CONHCH₂C₆H₅ | H | CONH₂ |
| 4-CONHCH₂CH₂OSO₃K | H | 6-NHCOCH₃ | C₂H₄OCOC₂H₅ | H | CONHCH₃ |
| 2-SO₃Na | H | 3,6-di-CH₃ | C₂H₄NHCOCH=CH₂ | H | CON(CH₃)₂ |
| 2-SO₃K | H | 3-CH₃ | CH₂C₆H₅ | H | SO₂C₆H₅ |
| 4-OSO₃K | H | 3-CH₃—6-NHCOCH₃ | C₂H₄CONHCH₂OH | H | SO₂C₆H₅ |
| 4-OCH₂CH₂—OSO₃K | H | 6-NHCOCH₃ | C₃H₆NHCONHC₂H₅ | CN | NHCOCH₃ |
| 4-CH₂—OSO₃NH(CH₃)₃ | C₂H₅ | 3,6-di-CH₃ | C₂H₅ | SCN | OC₆H₅ |
| 4-CONHCH₂CH₂OSO₃K | C₂H₅ | 3-CH₃ | C₂H₄SO₂NH₂ | CH₃ | C₆H₅ |
| 2-SO₃Na | C₂H₅ | 3-CH₃—6-NHCOCH₃ | C₂H₄SO₂NHC₂H₅ | CH₃ | SC₆H₅ |
| 2-SO₃K | C₂H₅ | 6-NHCOCH₃ | C₂H₄SCH₃ | CH₃ | SCH₂CH=CH₂ |
| 4-OSO₃K | C₂H₅ | 3,6-di-CH₃ | CH₂CH₂S—C(=N-)S-(2-methylbenzothiazolyl) | CH₃ | SC₆H₁₁ |
| 2-CH₃ | C₂H₅ | 3-CH₃ | CH₂CH₂S—C (1,2,4-triazolyl) | Cl | SO₃C₆H₄—p-OSO₃K |
| 4-COOH | C₂H₅ | 3-CH₃—6-NHCOCH₃ | CH₂CH₂—N(COCH₂)(COCH₂) (succinimide) | Cl | CH₂CH₂—OSO₃K |
| 2-OCH₃ | H | 6-NHCOCH₃ | C₂H₄O—C₆H₄ | Cl | CH₂CH₂—OSO₃K |
| 4-OCH₃ | H | 3,6-di-CH₃ | C₂H₄—N(CO—N—CH₃)(CO—CH₂) | Cl | CH₂CH₂—OSO₃K |
| 2-NO₂ | H | 3-CH₃ | CH₂CH(OH)CH₂OH | H | SO₂C₆H₁₀—p-OSO₃Na |
| 4-NO₂ | H | 3-CH₃—6-NHCOCH₃ | C₂H₄—N(CO—O)(CO—CH₂) | CH₂—SO₃K | SC₂H₅ |
| 2-Cl | H | 6-NHCOCH₃ | C₂H₄—N(CO—CH₂)(CO—CH₂) | CH₂—SO₃K | COC₆H₅ |

TABLE III-continued

[Structure: benzene ring with R substituent — CH=C(R14)—C(=O)—[thiophene with R12, R13, and CH3 on S ring]—N=N—[benzene ring with R1, R2, and N(R3)—C(=O)—R5]]

| R | $R^{14}$ | $R^1$, $R^2$, $R^5$ | $R^3$ | $R^{12}$ | $R^{13}$ |
|---|---|---|---|---|---|
| 2-OH | H | 3,6-di-CH$_3$ | C$_2$H$_4$—N(COCH$_2$—CH$_2$—COCH$_2$) | CH$_2$—SO$_3$K | COOCH$_3$ |
| 4-N(CH$_3$)$_2$ | H | 3-CH$_3$ | C$_2$H$_4$—N(CO—C$_6$H$_4$—CO) | CH$_2$—SO$_3$K | OOCCH$_3$ |
| 4-N(C$_2$H$_5$)$_2$ | H | 3-CH$_3$—6-NHCOCH$_3$ | C$_2$H$_4$—N(CO—NH—CO—CH$_2$) | CH$_2$—SO$_3$K | CONHCH$_2$CH$_2$OH |
| 4-COCH$_3$ | H | 6-NHCOCH$_3$ | C$_2$H$_4$—N(COCH$_2$—COCH$_2$—O) | CH$_2$—SO$_3$K | CONHCH$_2$CH$_2$—OSO$_3$K |
| 4-COOCH$_3$ | H | 3,6-di-CH$_3$ | C$_2$H$_4$—N(C(=O)—C$_6$H$_4$—SO$_2$) (benzisothiazolinone-dioxide) | H | CONHCH$_2$CH$_2$—OSO$_3$K |
| 4-COOC$_2$H$_5$ | C$_3$H$_7$—n | 3-CH$_3$ | C$_2$H$_4$—N(CO—S—CH$_2$—CO) | H | CONHCH$_2$CH$_2$—OSO$_3$K |
| 2-CN | C$_3$H$_7$—n | 3-CH$_3$—6-NHCOCH$_3$ | C$_2$H$_4$S—C(=N)—N(C$_2$H$_5$)—CH=N (imidazole) | H | CONHCH$_2$CH$_2$—OSO$_3$K |
| 4-CN | C$_3$H$_7$—n | 6-NHCOCH$_3$ | C$_2$H$_4$—N(CO—CH$_2$—CH$_2$—CH$_2$) | H | CONHCH$_2$CH$_2$—OSO$_3$K |
| 2-OCH$_3$ | C$_3$H$_7$—n | 3,6-di-CH$_3$ | C$_2$H$_4$NHC(=O)—C$_6$H$_5$ | H | CONHCH$_2$CH$_2$—OSO$_3$K |
| 4-OCH$_3$ | C$_3$H$_7$—n | 3-CH$_3$ | C$_2$H$_4$NHC(=O)—C$_6$H$_4$—OCH$_3$ | H | CH$_2$CH$_2$—SO$_3$Na |
| 4-CH$_3$ | H | 3-CH$_3$—6-NHCOCH$_3$ | CH$_2$CH$_2$S—C(=N)—NH—CH=N (triazole) | H | CH$_2$CH$_2$—SO$_3$Na |

TABLE III-continued

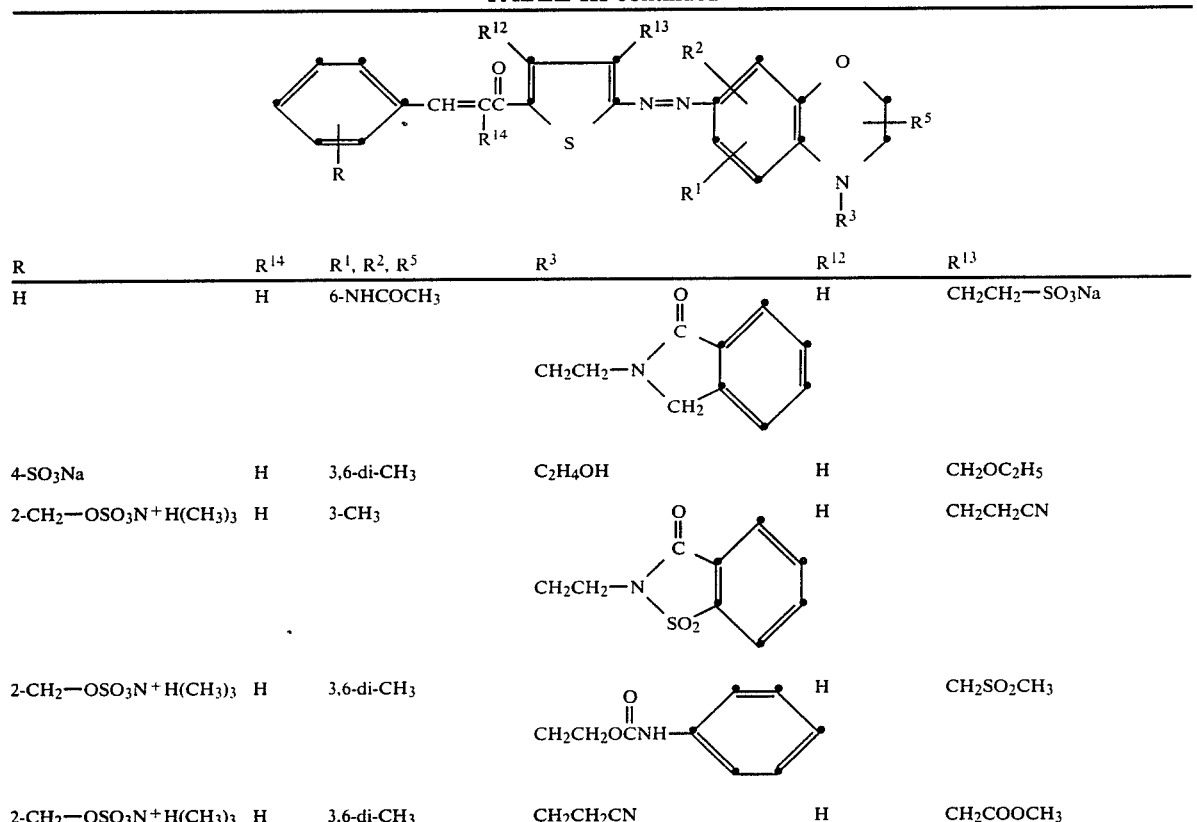

| R | R¹⁴ | R¹, R², R⁵ | R³ | R¹² | R¹³ |
|---|---|---|---|---|---|
| H | H | 6-NHCOCH₃ | (phthalimide-ethyl group: CH₂CH₂—N bonded to phthalimide) | H | CH₂CH₂—SO₃Na |
| 4-SO₃Na | H | 3,6-di-CH₃ | C₂H₄OH | H | CH₂OC₂H₅ |
| 2-CH₂—OSO₃N⁺H(CH₃)₃ | H | 3-CH₃ | (saccharin-ethyl group: CH₂CH₂—N bonded to benzosulfonimide) | H | CH₂CH₂CN |
| 2-CH₂—OSO₃N⁺H(CH₃)₃ | H | 3,6-di-CH₃ | CH₂CH₂OCNH—C₆H₅ (carbamate) | H | CH₂SO₂CH₃ |
| 2-CH₂—OSO₃N⁺H(CH₃)₃ | H | 3,6-di-CH₃ | CH₂CH₂CN | H | CH₂COOCH₃ |

The invention has been described in detail with particular reference to preferred embodiments thereof, but it will be understood that variations and modifications can be effected within the spirit and scope of the invention.

I claim:

1. A dye compound having the formula

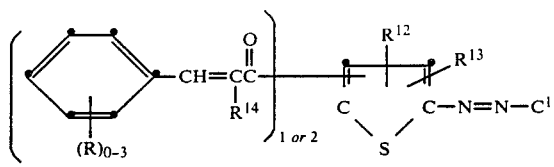

wherein each R¹⁴ is H or alkyl; each R is a substituent independently selected from alkyl, hydroxy, alkoxy, carboxy, halogen, nitro, alkoxycarbonyl, alkanoyloxy, alkanoyl, alkylamino, cyano, dialkylamino, and alkyl substituted with 1-3 of halogen, alkoxy, alkanoyl, alkanoyloxy, alkoxycarbonyl, alkanoylamino, cyano, nitro, carbamoyl, alkylcarbamoyl, sulfamoyl, or alkylsulfamoyl; R¹² and R¹³ are each selected from H, alkyl, alkoxy, alkanoyl, halogen, alkylsulfonyl, alkanoyloxy, SO₂NH₂, SO₂NHalkyl, SO₂N(alkyl)₂, CONH₂, CONHalkyl, —COOH, CON(alkyl)₂, arylsulfonyl, alkanoyl, alkanoylamido, aroyl, aryl, alkylthio, arylthio, alkenylthio, alkoxycarbonyl, hydroxyalkylcarbamoyl, cyclohexylthio, SO₃C₆H₅, cyano, thiocyano, cyclohexylsulfonyl, cyclohexyl, and alkyl substituted with 1-3 of alkoxy, cyano, halogen, SO₂alkyl, CONHalkyl, alkanoyloxy, or SO₂NHalkyl; C¹ is an aniline, tetrahydroquinoline, or benzomorpholine type azo type dye coupler which is unsubstituted or substituted; wherein at least one —SO₃M, or —OSO₃M group is present in said dye compound where M is selected from H⁺, NH₄⁺, Na⁺, K⁺, and the colorless cations of sulfuric acid or sulfonic acid salts of trimethylamine, triethylamine, and N,N-dimethylaniline; and wherein the coupler is selected from

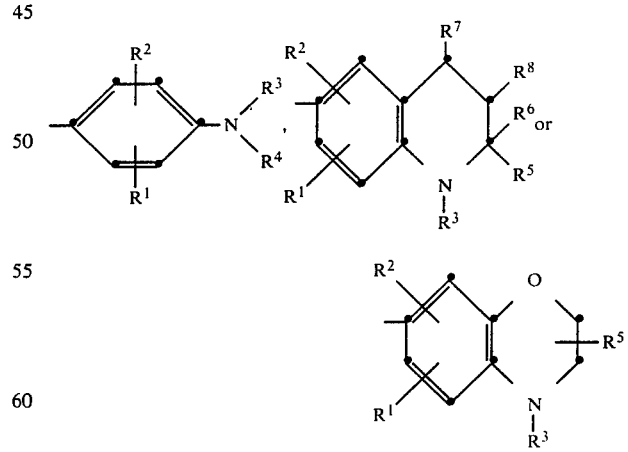

wherein:

R¹ and R² are each selected from hydrogen, fluorine, chlorine, bromine, alkyl, aryl, cycloalkyl, —COOH, alkoxy, phenoxy, alkylthio, arylthio, and radicals having the formula —NH—X—R⁹ in which X is —CO—, —COO—, or —SO₂— and R⁹ is selected from alkyl and alkyl substituted with halogen, hydroxy, phenoxy, aryl, cyano, cycloalkyl, alkylsulfonyl, alkylthio, alkanoyloxy, and alkoxy, and when X is —CO— in the formula —NH—X—$R^9$, $R^9$ also can be hydrogen, amino, alkenyl, alkylamino, dialkylamino, arylamino, aryl, or furyl;

$R^3$ and $R^4$ are selected from hydrogen; cycloalkyl; cycloalkyl substituted with one or two groups selected from alkyl, —OH, alkoxy, halogen, —COOH, and hydroxy substituted alkyl; phenyl or phenyl substituted with alkyl, —COOH, alkoxy, halogen, alkanoylamino, cyano or alkoxycarbonyl; straight or branched alkenyl; straight or branched alkyl and such alkyl substituted with 1-3 of the following: hydroxy; —COOH; halogen; cyano; amino; alkoxy; hydroxyalkoxy; succinimido; glutarimido; phenylcarbamoyloxy; phthalimido; phthalimidino; 2-pyrrolidono; cyclohexyl; phenoxy; phenyl or phenyl substituted with alkyl, alkoxy, halogen, alkanoylamino, cyano or alkoxycarbonyl; alkanoylamino; sulfamoyl; alkylsulfamoyl; vinylsulfonyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; a group of the formula

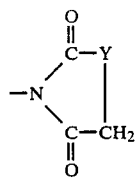

wherein Y is

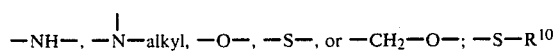

wherein $R^{10}$ is alkyl, phenyl, phenyl substituted with halogen, alkyl, alkoxy, alkanoylamino, cyano, or alkoxycarbonyl, pyridyl, pyrimidinyl, benzoxazolyl, benzimidazolyl, benzothiazolyl, or

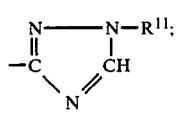

—$OXR^9$; —NH—X—$R^9$; —X—$R^9$; —$CONR^{11}R^{11}$; —$SO_2NR^{11}R^{11}$; wherein $R^9$ and X are as defined above and each $R^{11}$ is selected from H, alkyl, and alkyl substituted with 1-3 of halogen, hydroxy, phenoxy, alkoxy, aryl, cyano, cycloalkyl, alkylsulfonyl, alkylthio, alkanoyl, and alkanoyloxy; alkoxy substituted with hydroxy, cyano, alkanoyloxy, or alkoxy; phenoxy substituted with one or more of alkyl, alkoxy or halogen; and $R^3$ and $R^4$ combined as pentamethylene, ethyleneoxyethylene or ethylenesulfonylethylene which, with the nitrogen atom to which it is attached, forms a ring;

$R^5$, $R^6$, $R^7$ and $R^8$ are each selected from hydrogen and alkyl; and wherein at least one of R, $R^1$, $R^2$, $R^3$, $R^4$, $R^{12}$ and $R^{13}$ is —$SO_3M$ or —$OSO_3M$, or wherein an alkyl, cycloalkyl or aryl moiety thereof is substituted with 1-3 of —$SO_3M$ or —$OSO_3M$.

2. A compound of claim 1 wherein: $R^{12}$ and $R^{13}$ are each selected from H, alkanoyl, aroyl, alkoxycarbonyl, $CONH_2$, CONHalkyl, hydroxyalkylcarbamoyl, and alkyl substituted with 1-3 of alkoxy, cyano, halogen, $SO_2$alkyl, CONHalkyl or $SO_2$NHalkyl;

$R^1$ is alkyl, alkoxy, alkanoylamino, or alkoxycarbonylamino;

$R^2$ is hydrogen, alkyl, or alkoxy;

$R^3$ and $R^4$ are the same or different and selected from hydrogen, alkyl and alkyl substituted with hydroxy, alkoxy, alkoxyalkoxy, hydroxyalkoxy, carbamoyl, alkylcarbamoyl, alkanoylamino, sulfamoyl, alkylsulfamoyl, phenyl, cyclohexyl, 1-(2-pyrrolidono), phthalimidino, succinimido, cyano, phenoxy, alkylsulfonyl, phthalimido, benzoylsulfonicimido, triazolylthio, alkylsulfonamido, —$SO_2NHR^{11}$, phenylsulfonamido, alkoxycarbonylamino, alkylcarbamoyloxy, alkoxycarbonyl, alkoxycarbonyloxy,

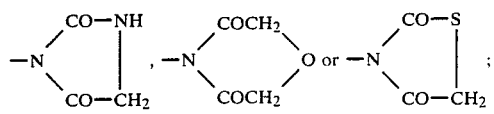

$R^5$ and $R^7$ are each hydrogen or alkyl; and wherein at least one of R, $R^1$, $R^2$, $R^3$, $R^4$, $R^{12}$ and $R^{13}$ is —$SO_3M$ or —$OSO_3M$, or an alkyl, cycloalkyl or aryl moiety thereof is substituted with 1-3 of —$SO_3M$ or —$OSO_3M$.

3. A dye compound according to claim 1 wherein the coupler has the formula

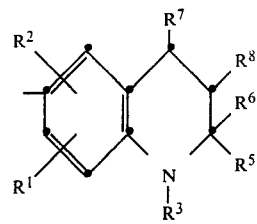

wherein $R^1$, $R^2$, $R^3$, $R^5$, $R^6$, $R^7$, and $R^8$ are as defined therein.

4. A dye compound according to claim 1 wherein the coupler has the formula

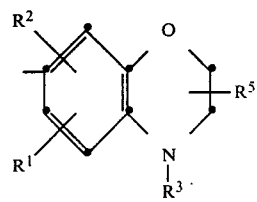

wherein $R^1$, $R^2$, $R^3$ and $R^5$ are as defined therein.

5. The compound of claim 1 having the formula

6. The compound of claim 1 having the formula
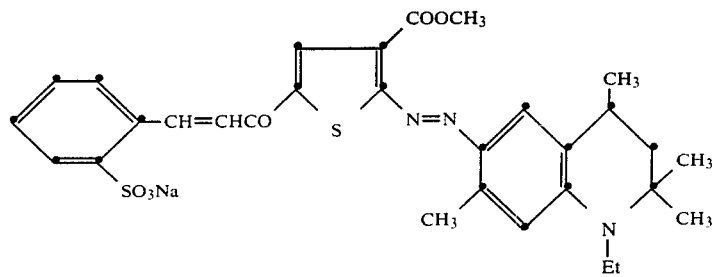
7. The compound of claim 1 having the formula
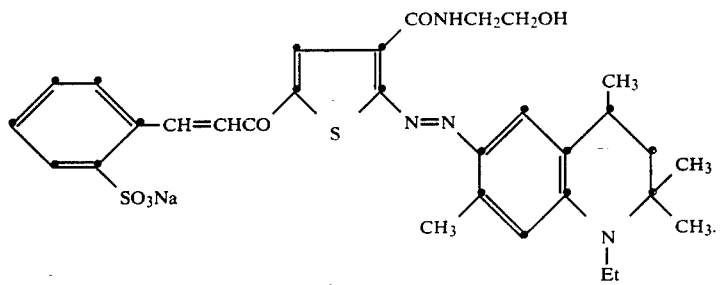
8. The compound of claim 1 having the formula
9. The compound of claim 1 having the formula
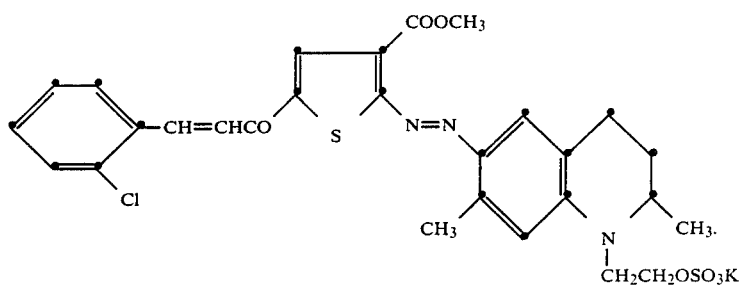
10. The compound of claim 1 having the formula:
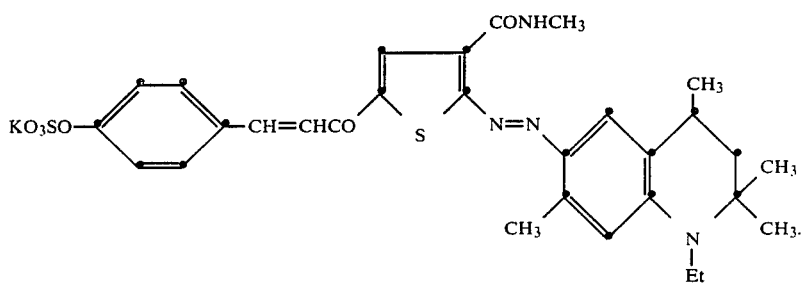

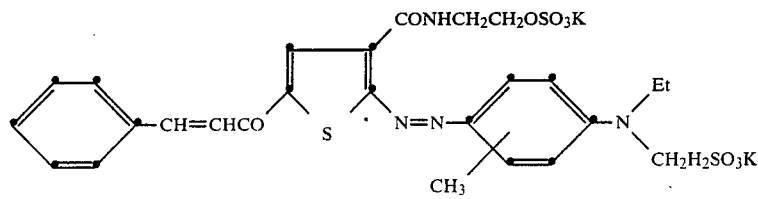
11. The compound of claim 1 having the formula
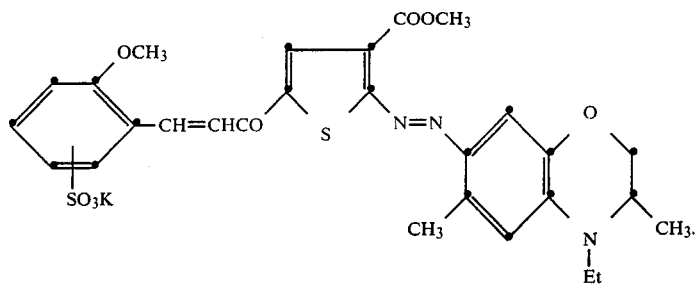
12. The compound of claim 1 having the formula
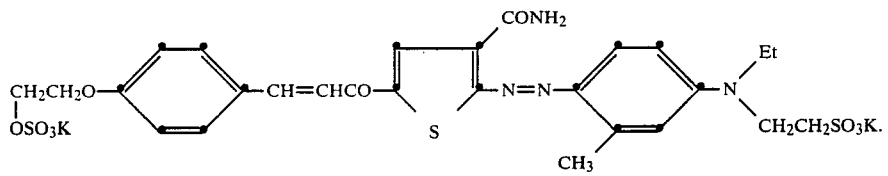
13. The compound of claim 1 having the formula
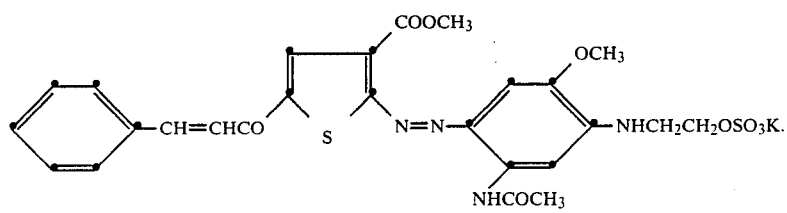
14. The compound of claim 1 having the formula
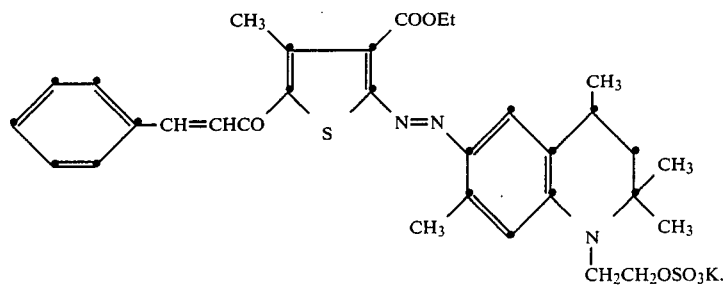
* * * * *